United States Patent Office 3,825,631
Patented July 23, 1974

---

3,825,631
ACETYL-BUTYL-CIS-1-PROPENYL PHOSPHONATE
Burton G. Christensen, Scotch Plains, N.J., and William J. Leanza, Staten Island, N.Y., assignors to Merck & Co., Inc., Rahway, N.J.
No Drawing. Original application May 15, 1968, Ser. No. 729,388, now Patent No. 3,625,982. Divided and this application Dec. 1, 1970, Ser. No. 94,176
Int. Cl. A01n 9/36; C07f 9/40
U.S. Cl. 260—941     1 Claim

ABSTRACT OF THE DISCLOSURE

A new class of cis-1-propenyl-phosphinite derivatives are disclosed. These products are useful as intermediates in the preparation of (±) and (−) (cis-1,2-epoxypropyl)phosphonic acids which have utility as antibiotics.

---

This application is a division of S.N. 729,388, filed May 15, 1968, now U.S. Pat. 3,625,982.

BACKGROUND OF THE INVENTION

Although many valuable antibiotics have been discovered which are useful in the treatment of diseases, such antibiotics are generally active against only a limited number of pathogens or are rendered ineffective by the development of antibiotic-resistant strains of pathogens. It is therefore important that new antibiotics be found which are active against a wide range of pathogens as well as against resistant strains of pathogens.

Accordingly, this invention relates to the preparation of (−) (cis-1,2-epoxypropyl)phosphonic acid or mixtures thereof with its dextrorotatory enantiomer which (−) enantiomer has been found to be a valuable antibiotic exhibiting activity against various microorganisms and, in particular, against various gram-negative and gram-positive pathogens.

SUMMARY OF THE INVENTION

In accordance with the present invention, it is found that (cis-1,2-epoxypropyl)phosphonic acid is prepared by oxidation of (cis-1,2-epoxypropyl)phosphonous acid or the esters, halides and salts thereof. Thus, (±) (cis-1,2-epoxypropyl)phosphonic acid is prepared by oxidation of (±) (cis-1,2 - epoxypropyl)phosphonous acid. Alternatively, (±)(cis-1,2-epoxypropyl)phosphonous acid is separated into its (−) and (+) enantiomers each of which are then subjected to oxidation to yield (−) and (+) (cis-1,2-epoxypropyl)phosphonic acids.

In the ensuing description, teachings which are directed to the preparation of salts of (cis-1,2-epoxypropyl)phosphonic acid are intended to include the free acid. Similarly, the oxidation of (cis-1,2-epoxypropyl)phosphonous acid salts is intended to include the halides and the free acid and esters thereof and intermediates used in the preparation of (cis-1,2-epoxypropyl)phosphonous acid salts may be in the free acid form or esters thereof or halides.

(Cis-1,2-epoxypropyl)phosphonic acid and its salts both in the (±) and (−) forms are useful antimicrobial agents which are active in inhibiting the growth of both gram-positive and gram-negative pathogenic bacteria. The (−) form and particularly its salts are active against Bacillus, Escherichia, Staphylococci, Salmonella and Proteus pathogens and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, (±) and (−) (cis-1,2-epoxypropyl)phosphonic acid and its salts can be used as antiseptic agents to remove susceptible organisms from pharmaceutical, dental and medical equipment and other objects subject to infection by such organisms. Similarly, they can be used to separate certain microorganisms from mixtures of microorganisms. Salts of (−)(cis-1,2 - epoxypropyl)phosphonic acid are also useful in treatment of diseases caused by bacterial infections in man and animals and are particularly valuable in this respect since they are active against resistant strains of pathogens. These salts are especially valuable since they are effective when given orally although they can also be administered parenterally.

The salts of (±)(cis-1,2-epoxypropyl)phosphonic acid are useful as preservatives in industrial applications since they effectively inhibit undesirable bacterial growth in the white water used in paper mills and in paints, e.g. in polyvinyl acetate latex paint.

Additionally, the (+) enantiomer is converted by procedures known to those skilled in the art to the (−) enantiomers.

When (±) (cis-1,2-epoxypropyl)phosphonic acid or its salts or labile esters are used for combatting bacteria in man or lower animals, they may be administered orally in a dosage form such as capsules or tablets, or in a liquid solution or suspension. These formulations may be prepared using diluents, granulating agents, preservatives, binders, flavoring agents and coating agents known to those skilled in this particular art. Alternatively, they may be administered parenterally by injection in a sterile vehicle, and for this it is normal to use a salt that is soluble in the liquid vehicle.

The (−) (cis-1,2-epoxypropyl)phosphonic acid referred to herein rotates plane-polarized light in a counterclockwise direction (to the left as viewed by the observer) when the rotation of its disodium salt is measured in water (5%, concentration) at 405 mμ.

The designation "cis" used in describing the 1,2-epoxypropyl phosphonic acid compounds means that each of the hydrogen atoms attached to carbon atoms 1 and 2 of the propylphosphonic acid are on the same side of the oxide ring.

In view of the above, it is an object of this invention to provide a process for preparing (±)(cis-1,2-epoxypropyl) phosphonic acid.

Another object is to provide a process for preparing (−) (cis-1,2-epoxypropyl)phosphonic acid.

A further object is to provide novel phosphonous acid compounds and novel intermediates useful in the preparation thereof.

DETAILED DESCRIPTION OF THE INVENTION

The above objects and others which will become apparent to those skilled in the art are accomplished in accordance with the present invention by subjecting to oxidation a cis-phosphonous or cis-thiophosphonous acid compound having the formulae

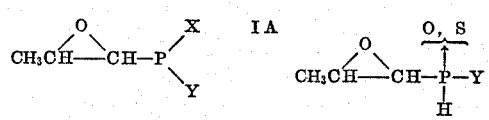

wherein X represents hydroxy, thiol, hydrogen or Y and Y represents hydrogen, halogeno or —OR, wherein R represents hydrogen or an aliphatic, cycloaliphatic, aromatic or aromatic heterocyclic group. Where Y represents OH or SH, the compounds exist essentially in the tautomeric form of Formula IA and it is intended that salts of such compounds be included.

Thus, R represents a substituted or non-substituted alkyl group, preferably a lower alkyl group having from 1 to about 6 carbon atoms. Illustrative groups include methyl, ethyl, propyl, isopropyl, butyl, t-butyl, i-butyl, amyl, hexyl, acetoxymethyl, dimethylamino, diethylaminomethyl and the like.

Aromatic groups represented by R include substituted or non-substituted aryl groups, for example, phenyl, naphthyl and substituted derivatives thereof such as tolyl, xylyl, cyanophenyl, nitrophenyl, halophenyl such as chlorophenyl, anilino, biphenylyl, formylphenyl, hydroxyphenyl and the like. Aralkyl groups included within the definition of R include substituted or non-substituted aralkyl groups such as benzyl, phenethyl, p-methylbenzyl and the like which may also contain additional substituents such as halogen, e.g. chloro, bromo, fluoro, or cyano, nitro, hydroxy and the like.

Additionally, R represents substituted or non-substituted cycloalkyl groups, e.g. cyclopentyl, cyclohexyl and the like.

Further, R represents substituted or non-substituted alkenyl groups including allyl, butenyl, pentenyl, hexenyl and the like which may additionally have substituents such as cyano, halogenyl and the like.

R also represents substituted or non-substituted alkynyl groups such as propargyl, butynyl, hexynyl and the like which may have substituents such as cyano, halogeno and the like.

Further, R represents substituted or non-substituted cycloalkenyl groups such as cyclopentenyl, cyclohexenyl and the like.

Additionally, R represents aromatic heterocyclic groups containing oxygen, sulfur or nitrogen, e.g. pyridyl, thienyl, furyl, pyrryl and the like.

Illustrative salts of compounds of Formula I where Y=OH include both organic and inorganic salts. Examples of such salts are inorganic metallic salts such as sodium, aluminum, potassium, ammonium, calcium, magnesium, silver and iron salts. Organic salts that may be mentioned as representative include salts with primary, secondary or tertiary amines such as monoalkylamines, dialkylamines, trialkylamines and nitrogen-containing heterocyclic amines. Representative examples are salts with amines such as α-phenethylamine, diethylamine, quinine, brucine, lysine, protamine, arginine, procaine, ethanolamine, morphine, benzylamine, ethylenediamine, N,N'-dibenzylethylenediamine, diethanolamine, piperazine, dimethylaminoethanol, 2-amino-2 - methyl-1-propanol, theophylline, esters of amino acids and N-methylglucamine. If desired, the basic moiety of the salt may be a biologically active amine such as erythromycin, oleandomycin or novobiocin.

Where Y represents halogen, such halogen group may be chlorine, bromine, iodine or fluorine.

As stated above, the method of this invention comprises the oxidation of compounds having the structure of Formula I wherein (±) (cis-1,2-epoxypropyl)phosphonic acid is obtained. The particular product obtained upon direct oxidation of the compounds of Formula I will, of course, depend on the specific compound being oxidized. Thus, oxidation of (±) (cis-1,2-epoxypropyl)phosphonous acid or (±) (cis-1,2-epoxypropyl)thiophosphonous acid will directly yield (cis-1,2-epoxypropyl) phosphonic acid, the oxidation state of the phosphorous atom having been increased during the oxidation reaction. Where, however, in Formula I Y represents an OR, a halogen group or a salt of an OH containing compound, the corresponding (cis-1,2-epoxypropyl)phosphonic acid ester, halide or salt will be obtained. If desired, the halide ester or salt derivative of (±) (cis-1,2-epoxypropyl)phosphonic acid may then be converted to free (cis-1,2-epoxypropyl)phosphonic acid.

The oxidation of the compounds of Formula I is conveniently carried out in aqueous medium. However, any solvent which is compatible with the oxidizing agent and in which the compound to be oxidized is partially soluble may be utilized. Thus, exemplary solvents are alcohols, especially lower alkanols, e.g. ethanol, butanol; cyclic ethers such as dioxane and tetrahydrofuran; dimethylformamide and the like. As stated above, compatibility with the oxidizing agent is the main criterion in selecting a solvent. Thus, for certain oxidizing agents, e.g. mercuric chloride, an aliphatic hydrocarbon solvent such as pentane or hexane is suitable.

The temperature of the oxidation reaction is not critical but the reaction is preferably conducted at from —10 to 60° C. or higher.

The oxidation of the compounds represented by Formula I to yield (cis-1,2-epoxypropyl)phosphonic acid is accomplished by a wide variety of oxidizing agents. Thus, any oxidizing agent which will raise the oxidation state of the phosphorous atom in (cis-1,2-epoxypropyl)phosphonous acid is within the scope of this invention. Care must be taken, however, during oxidation to insure that the epoxide ring, which is unstable in higher acid media, is not disrupted. Methods by which disruption of the epoxide bond is minimized or eliminated include neutralization of the reaction mixture by the regulation of pH and the utilization of buffering solutions.

Typical oxidizing agents which are utilized in the process of this invention include air; ozone; Fehlings solution; inorganic and organic peracids such as perchloric acid, periodic acid, pertungstic acid, pervanadic acid, permolybdic acid, perphthallic and perbenzoic acid; perchlorates or persulfates such as sodium perchlorate, potassium perchlorate or sodium persulfate; ceric sulfate; metal nitrates such as silver nitrate, mercuric nitrate, ceric nitrate; bismuthates such as sodium bismuthate; pyrophosphates such as manganese pyrophosphate; metal complexes such as ammoniacal ceric nitrate or ammoniacal silver nitrate; metal oxides such as mercuric oxide, manganese dioxide, ceric oxide, silver oxide, arsenic oxide or supric oxide; metal acylates such as lead tetraacetate; metal tungstates such as sodium or potassium tungstate; halogens such as iodine, chlorine, bromine or fluorine; hypohalites such as sodium or calcium hypohalite or t-butyl hypohalite; halogenates such as sodium bromate or potassium iodate and the like; metal permanganates such as potassium permanganate; metal chromates such as potassium dichromate; organic and inorganic peroxides such as dicumylperoxide, hydrogen peroxide and the like; organic hydroperoxides such as t-butyl hydroperoxide, cumene hydroperoxide or anylene hydroperoxide; peroxy acids such as peroxytrifluoroacetic acid; inorganic acids such as nitric acid and the like. Preferred oxidizing agents are hydrogen peroxide, iodine, silver oxide and a mixture of hydrogen peroxide and sodium tungstate.

In most instances, oxidation of (cis-1,2-epoxypropyl) phosphonous acid and the indicated derivatives thereof will normally yield the salts of (cis - 1,2-epoxypropyl) phosphonic acid due to the work-up procedures necessary for product recovery. Actually it is preferred that the product be recovered in the salt form.

Those salts which are pharmaceutically acceptable and, substantially non-toxic may be employed when using the (±) (cis-1,2-epoxypropyl)phosphonic acid as an antibacterial agent. Other salts which are not nomally employed in pharmaceutical applications are useful as intermediates in forming the free acid and for making other salts by metathesis. In addition, the salts with optically active amines may be employed as intermediates in resolving the (±) (cis-1,2-epoxypropyl)phosphonic acid into its optically active stereoisomers.

Where a halogen-substituted (cis-1,2-epoxypropyl)phosphonic acid is obtained upon oxidation, i.e., where a compound of Formula I is oxidized wherein Y represents a halogen atom, such product is converted to (cis-1,2-epoxypropyl)phosphonic acid salts by alkaline hydrolysis. The free acid may then be converted to a more easily recoverable salt by treatment with a less soluble metal salt such as calcium acetate whereby the calcium salt of (cis-1,2-epoxypropyl)phosphonic acid precipitates from the aqueous solution.

In those instances where compounds corresponding to Formula I, wherein Y represents OR are oxidized, the corresponding (cis-1,2-epoxypropyl)phosphonic acid ester is obtained. These esters may be converted to salts of (cis - 1,2-epoxypropyl)phosphonic acid by a number of methods such as, for example, by photochemical reaction, hydrolysis with base and/or acid, hydrogenolysis, conversion to a trimethylsilyl derivative and hydrolysis thereof and the like. The optimal method in any given instance depends upon the particular ester involved and representative examples appear in the experimental portion hereof.

In addition to oxidizing ($\pm$)(cis-1,2-epoxypropyl)phosphonous acid compounds of Formula I to yield the corresponding antibacterially active ($\pm$)(cis-1,2-epoxypropyl) phosphonic acid compound, the compounds of Formula I may be resolved, if desired, into the (—) and (+) enantiomers thereof, as by formation of a salt with an optically active amine such as $\alpha$-phenethylamine, separation of the diastereoisomers of such salt by fractional crystallization and recovery of the (—) and (+) enantiomers of (cis-1,2-epoxypropyl)phosphonous acid. The separated enantiomers may then be subjected to oxidation as described above to obtain (—) and (+)(cis-1,2-epoxypropyl)phosphonic acid compounds. The antibiotic activity resides in (—)(cis-1,2-epoxypropyl)phosphonic acid so that this acid and its salts possess essentially twice the antibacterial activity (on a weight basis) of the ($\pm$)(cis-1,2-epoxypropyl)phosphonic acid compounds.

The method utilized to resolve ($\pm$)(cis - 1,2 - epoxypropyl) phosphonous acid into its optically active forms prior to oxidation is not part of the present invention, but is an invention being claimed in another co-pending application of the assignee.

The preparation of the starting materials of the process of this invention, i.e. compounds of Formula I, is given in detail in the following examples. In general, however, a compound having the formulae

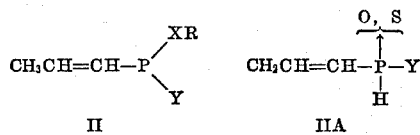

II     IIA wherein X, R and Y are defined above, is treated with an acylating agent such as acetyl chloride, propionyl chloride, butyryl chloride and the like, to thereby obtain a compound having the formula

III

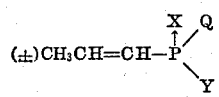

wherein X and Y are defined above and Q represents an acyl group, i.e. an alkanoyl or aroyl group. Epoxidation of a compound of Formula III affords a compound having the formula

IV

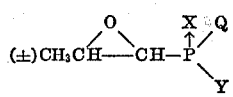

wherein X, Q and Y are defined above.

Deacylation of the compounds represented by Formula IV yield the satrting materials of the present invention which are illustrated by Formula I above.

More particularly, dibutyl cis-1-propenylphosphonite is prepared by reaction of 1-propenyl magnesium bromide and dibutyl chlorophosphite. The treatment of dibutyl cis-1-propenylphosphonite with acetyl chloride yields ($\pm$) acetyl-butyl cis - 1 - propenylphosphonate which, when treated with hydrogen peroxide and sodium tungstate, affords ($\pm$)acetyl-butyl (cis-1,2-epoxypropyl) phosphonate. Alkaline hydrolysis of the latter compound yields ($\pm$) sodium (cis-1,2-epoxypropyl)phosphonite.

Alternatively, the starting materials of Formula I are prepared, for example, by acidic hydrolysis of a diester of cis-1-propenylphosphonous acid, e.g. di-n-butyl-cis-1-propenylphosphonite, such as by treatment with hydrochloric acid in n-propanol and neutralizing with benzylamine. In this manner there is obtained cis-1-propenylphosphonous acid, benzylammonium salt which is then epoxidized using, for example, hydrogen peroxide and sodium tungstate to afford ($\pm$)(cis-1,2-epoxypropyl)phosphonous acid, benzylammonium salt. The latter compound is then oxidized as described above to yield ($\pm$) (cis-1,2-epoxypropyl) phosphonic acid, benzylammonium salt.

Additionally, the starting materials are prepared by reduction of O,S-dialkyl-(cis - 1,2 - epoxypropyl)phosphonthioates. Thus, 1 g. of a ($\pm$) or (—)O,S-dialkyl(cis-1,2-epoxypropyl)phohsphonthioate is contacted with 200 mg. of deactivated Raney nickel in 20 ml. of dioxane. After 3 hours the mixture is filtered and alkyl ($\pm$) or (—)(cis-1,2-epoxypropyl)phosphonite is recovered and the solution is basified with sodium hydroxide to afford sodium ($\pm$) or (—)(cis-1,2-epoxypropyl)phosphonite.

Specific embodiments of the invention are described in the following examples. It is to be understood, however, that the examples are merely for purposes of illustration and it is not intended that the scope of the invention be limited thereby.

EXAMPLE 1

Dibutyl-1-propenyl phosphonite

A solution of 1-propenyl magnesium bromide in 250 ml. of tetrahydrofuran is prepared from 30.6 g. of 1-bromopropene (cis/trans ratio 2:1) and 7 g. of magnesium. The solution is cooled to —40° C. and stirred during the addition of 54 g. of dibutyl-chlorophosphite in 100 ml. of tetrahydrofuran during a period of 10 minutes. The temperature is kept below —30° C. with the aid of a Dry Ice bath. The solution is stirred at room temperature for 3 hours and 56 g. of dry pyridine are then added with slight cooling. The pyridine magnesium bromide is filtered off, washed with 50 ml. of tetrahydrofuran and the combined filtrate is evaporated under reduced pressure to a syrup. The syrup is extracted with 300 ml. of petroleum ether which is decanted and evaporated. The residual oil is distilled to yield 30 g. of a cis-trans mixture of dibutyl-1-propenyl phosphonite, b.p. 74°/1 mm. The cis and trans isomers are separated by fractional distillation.

EXAMPLE 2

Acetyl-butyl cis-1-propenyl phosphonate

Di-n-butyl cis-propenyl phosphonite (109 g.) is added dropwise to 39.2 g. acetyl chloride keeping the temperature of the reaction mixture below 30° C. by means of an external ice bath. The addition is completed in about 45 minutes. The reaction mixture is allowed to stand for 15 hours at room temperature, after which the n-butyl chloride which forms during the reaction is removed in vacuo, leaving acetyl-butyl cis-1-propenyl phosphonate.

In a similar fashion, acetyl-ethyl cis-propenyl phosphonate, propionyl-butyl cis-propenyl phosphonate, butyryl-butyl cis-propenyl phosphonate are prepared by utilization of propionyl chloride and butyryl chloride in place of acetyl chloride.

EXAMPLE 3

($\pm$)Acetyl-butyl(cis-1,2-epoxypropyl)phosphonate

One gram of acetyl-butyl cis-1-propenylphosphonate is treated with an aqueous solution of 1.0 ml. 30% hydrogen peroxide and 20 mg. of sodium tungstate while maintaining a pH of 6.0. The reaction mixture is heated in a water bath at 60° C. for one hour. One hundred milligrams of manganese dioxide are then added to decompose excess peroxide and the suspension is filtered to give a solution of ($\pm$)acetyl-butyl (cis-1,2-epoxypropyl)phosphonate.

EXAMPLE 4

Preparation of sodium(cis-1,2-epoxypropyl)phosphonite

While maintaining a pH of 10.5, 2.5 N sodium hydroxide is added dropwise to the solution of (±)acetylbutyl(cis-1,2-epoxypropyl)phosphonate prepared in Example 3. The sodium hydroxide is slowly consumed and uptake ceases when 2 equivalents are added. The solution is lyophilized to yield sodium(cis-1,2-epoxypropyl)phosphonite.

EXAMPLE 5

Sodium(±)(cis-1,2-epoxypropyl)phosphonate

One gram of sodium(±)(cis-1,2-epoxypropyl)phosphonite is treated with an aqueous solution of 1.0 ml. of 30% hydrogen peroxide and 20 mg. of sodium tungstate while maintaining a pH of 6.0. The reaction is heated in a water bath at 40° C. for two hours. One hundred milligrams of manganese dioxide are then added to decompose excess hydrogen peroxide and the mixture is filtered to afford a solution of sodium(±)(cis-1,2-epoxypropyl) phosphonate.

EXAMPLE 6

Sodium(—)(cis-1,2-epoxypropyl)phosphonate

Two grams of sodium(—)(cis-1,2-epoxypropyl)phosphonite are treated with an aqueous solution of bromine (1.1 equivalents) for 3 hours at 40° C. while maintaining a pH of 6.0 and the solution is evaporated to afford sodium(—)(cis-1,2-epoxypropyl)phosphonate.

EXAMPLE 7

Potassium(±)(cis-1,2-epoxypropyl)phosphonate

One gram of potassium (±)(cis-1,2-epoxypropyl)phosphonite is treated with an aqueous solution of 1.0 ml. of 30% hydrogen peroxide while maintaining a pH of 6.0. The reaction is heated in a water bath at 40° C. for two hours. One hundred milligrams of manganese dioxide are then added to decompose excess hydrogen peroxide and the mixture is filtered to afford a solution of potassium(±)(cis-1,2-epoxypropyl)phosphonate.

EXAMPLE 8

Sodium(±)(cis-1,2-epoxypropyl)phosphonate

Two grams of sodium(±)(cis-1,2-epoxypropyl)phosphonite is treated with a methanolic suspension of 1.1 equivalents of freshly prepared silver oxide. The reaction is stirred and heated for 3 hours at 40° C., filtered and evaporated in vacuo to afford sodium(±)(cis-1,2-epoxypropyl)phosphonate.

EXAMPLE 9

Sodium(±)(cis-1,2-epoxypropyl)phosphonate

One gram of sodium(cis-1,2-epoxypropyl)phosphonite is treated with 1.1 equivalents of an ethanolic solution of perphthalic acid. The reaction mixture is heated for four hours at 20° C., extracted and concentrated to afford sodium(±)(cis-1,2-epoxypropyl)phosphonate.

EXAMPLE 10

Sodium(±)(cis-1,2-epoxypropyl)phosphonate

One gram of chloro(cis-1,2-epoxypropyl)phosphonite is treated with 1.1 equivalents of peroxytrifluoroacetic acid in 20 ml. of methylene chloride and the solution is allowed to stand for 8 hours at 10° C., while maintaining the pH at 6.0. The solution is then basified with sodium hydroxide, filtered and evaporated in vacuo to afford sodium (±)(cis-1,2-epoxypropyl)phosphonate.

EXAMPLE 11

Sodium(±)(cis-1,2-epoxypropyl)phosphonate

One gram of benzyl(cis-1,2-epoxypropyl)phosphonite in 30 ml. ethanol is treated with an aqeous solution of 1.0 ml. of 30% hydrogen peroxide and 30 mg. of sodium tungstate while maintaining a pH of 6.0. The reaction is heated in a water bath for two hours at 40° C. One hundred milligrams of manganese dioxide are added and the mixture is filtered to afford a solution of benzyl(±)-(cis-1,2-epoxypropyl)phosphonate. The solution is then treated with 250 mg. of 10% Pd/C and shaken with 40 p.s.i. of hydrogen at room temperature for 15 minutes. The reaction is then filtered and basified with sodium hydroxide and concentrated to afford sodium(±)(cis-1,2-epoxypropyl)phosphonate.

In a similar manner, other (cis-1,2-epoxypropyl)phosphonic acid esters are prepared. The ester is converted to the free acid or a salt thereof by appropriate procedures described hereinafter.

EXAMPLE 12

Sodium(±)(cis-1,2-epoxypropyl)phosphonate

Ammonium(±)(cis-1,2-epoxypropyl)phosphonite (0.2 mole) is dissolved in 500 ml. of anhydrous methanol at 5° C. To the solution there is added 0.2 mole of α-(+)-phenethylamine hydrochloride and the methanol completely removed in vacuo at less than 35° C. in a nitrogen atmosphere to afford (±)α-(+)-phenethylammonium(cis-1,2-epoxypropyl)phosphonite mixed with ammonium chloride. Isopropanol (125 ml.) is added, the mixture heated to reflux and then filtered while hot. The filtrate is cooled to 25° C. and the product filtered, washed with isopropanol and air-dried at 25° C. to afford α-(+)-phenethylammonium(—)(cis - 1,2 - epoxypropyl)phosphonite having a high degree of optical purity.

The diastereomer, α - (+) - phenethylammonium(+)-(cis-1,2-epoxypropyl)phosphonite, is obtained by concentrating the mother liquors, filtering the crystalline precipitate and washing with 10 ml. of very cold isopropanol.

Each of the diastereomers is then subjected to oxidation in accordance with the procedure of Example 5. α-(+)-Phenethylammonium(—)(cis - 1,2 - epoxypropyl)phosphonate is then treated with one equivalent of sodium hydroxide, extracted and concentrated to afford sodium-(—)(cis-1,2-epoxypropyl)phosphonate.

When the oxidation process of the invention leads to an ester of (±)(cis-1,2-epoxypropyl)phosphonic acid, such ester may be converted to the free acid or preferably to a salt by one of several methods, the method of choice depending upon the nature of the ester moiety to be removed.

Thus, when R represents alkenyl, alkynyl or aralkyl moieties, the preferred method for removing them is by hydrogenolysis, as by the following procedure:

A solution of 3.2 g. of (±)dibenzyl(cis-1,2-epoxypropyl)phosphonate in 250 ml. of methanol is hydrogenated at 40 p.s.i. at room temperature for 15 minutes in the presence of 800 mg. of 10% palladium-on-charcoal catalyst and 2 g. of potassium bicarbonate. The solution is filtered from the catalyst and evaporated to dryness in vacuo at room temperature to yield (±)potassium(cis-1,2-epoxypropyl)phosphonate.

When R is lower alkyl or aryl, the preferred method for removing these groups is by ultraviolet light irradiation in the presence of base or by alkaline hydrolysis as exemplified below:

A solution of 4 g. of diphenyl(±)(cis-1,2-epoxypropyl) phosphonate in 100 ml. of an aqueous 2% solution of trimethylammonium carbonate is irradiated in a quartz flask at 25–30° C. for 4 hours with an ultraviolet light source. The solution is evaporated to dryness and the residue extracted into anhydrous methanol. The solution is then passed over a sulfonic acid resin column (IR–120 previously dehydrated with methanol) on the hydrogen cycle at 0–5° C. The effluent is collected and rapidly adjusted with cyclohexylamine to pH 5. Concentration of the solution to dryness affords (±)(cis-1,2-epoxypropyl) phosphonic acid monocyclohexylamine salt.

A solution of 7 g. of (±)diethyl(cis-1,2-epoxypropyl)phosphonate in 75 ml. of 2% trimethylammonium carbonate solution in a quartz flask is irradiated with an ultraviolet light source for 2 hours at 25–30° C. Five milliliters of trimethylamine are added and the solution is evaporated to dryness in vacuo. The resulting product is crystallized from alcohol to afford (±)bis-trimethylammonium(cis-1,2-epoxypropyl)phosphonate.

Substituted alkyl and aryl esters are preferably hydrolyzed with base such as an alkali or alkaline earth metal hydroxide or oxide. Representative conditions are:

(±)Bis-acetoxymethyl(cis - 1,2 - epoxypropyl)phosphonate (0.1 mole) is dissolved in 50 ml. of water and then 0.1 mole of calcium oxide is added. The solution is heated with stirring at 20–30° C. for 2 hours. It is then concentrated to dryness in vacuo to give a residue of (±)calcium(cis-1,2-epoxypropyl)phosphonate.

A solution of 50 mm. of (±)diphenyl(cis-1,2-epoxypropyl)phosphonate in 10 ml. of 30% ethanol-water is refluxed with a two-fold excess of barium hydroxide in a nitrogen atmosphere for 1½ hours. The reaction is cooled, adjusted to pH 8 with 4N sulfuric acid and extracted 3 times with ethyl acetate. The remaining aqueous slurry is stirred overnight at room temperature with 30 g. of sodium sulfate. The solids are removed by filtration and the filtrate evaporated to dryness to give (±)(cis-1,2-epoxypropyyl)phosphonic acid disodium salt.

Where R represents aryl or substituted aryl, the conversion to salts is conveniently effected by treatment with sodium in a tertiary amine, i.e., a solution of 5 g. of (±)diphenyl(cis - 1,2 - epoxypropyl)phosphonate in 5 ml. of methanol is added to 100 ml. of trimethylamine. Small pieces of sodium are gradually added to a total of 2.0 g. The solvents are removed by concentration and the product is extracted into methanol. The methanol solution is then passed over a column of IR–120 resin on the hydrogen cycle which has been precooled to 5° C. The effluent is then basified to pH 8.2 with phenethylamine and concentrated to give (±)(cis - 1,2 - epoxypropyl)phosphonic acid as the bis-phenethylamine salt.

Obviously, many modifications and variations of the present invention are possible in the light of the above teachings. It is therefore to be understood that, within the scope of the appended claim, the invention may be practiced otherwise than as specifically described.

Having thus described the invention, what is claimed and desired to be secured by Letters Patent of the United States is:

1. Acetyl-butyl-cis-1-propenyl phosphonate.

References Cited

UNITED STATES PATENTS 3,456,039   7/1969   Beriger et al. _____ 260—941 X

ANTON H. SUTTO, Primary Examiner

U.S. Cl. X.R.

260—970, 989; 424—199, 219